United States Patent
Zhang et al.

(10) Patent No.: US 12,051,012 B2
(45) Date of Patent: Jul. 30, 2024

(54) METHOD AND SYSTEM FOR INFORMATION THEORY-BASED QUESTIONING FOR GOAL-ORIENTED DIALOG SYSTEM

(71) Applicant: SEOUL NATIONAL UNIVERSITY R&DB FOUNDATION, Seoul (KR)

(72) Inventors: Byoung-Tak Zhang, Seoul (KR); Sang-Woo Lee, Seoul (KR); Yu-Jung Heo, Gwangmyeong-si (KR)

(73) Assignee: SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 857 days.

(21) Appl. No.: 17/263,609

(22) PCT Filed: Nov. 15, 2018

(86) PCT No.: PCT/KR2018/014008
§ 371 (c)(1),
(2) Date: Jan. 27, 2021

(87) PCT Pub. No.: WO2020/091129
PCT Pub. Date: May 7, 2020

(65) Prior Publication Data
US 2021/0319343 A1      Oct. 14, 2021

(30) Foreign Application Priority Data
Oct. 31, 2018   (KR) .................. 10-2018-0131716

(51) Int. Cl.
*G06N 5/04*    (2023.01)
*G06F 40/35*   (2020.01)
*G06N 20/00*   (2019.01)

(52) U.S. Cl.
CPC ............... *G06N 5/04* (2013.01); *G06F 40/35* (2020.01); *G06N 20/00* (2019.01)

(58) Field of Classification Search
CPC .................... G06N 5/04; G06F 40/35
See application file for complete search history.

(56) References Cited

U.S. PATENT DOCUMENTS

2020/0050942 A1\*   2/2020   Sun .................. G06F 40/40

FOREIGN PATENT DOCUMENTS

CN    108491433 A  \*  9/2018  ........... G06F 16/901
JP    2015-230514 A    12/2015
(Continued)

OTHER PUBLICATIONS

Buck, Christian, et al. "Ask the right questions: Active question reformulation with reinforcement learning." arXiv preprint arXiv: 1705.07830 (2017). (Year: 2017).\*
(Continued)

*Primary Examiner* — Hal Schnee
(74) *Attorney, Agent, or Firm* — Sughrue Mion, PLLC

(57) ABSTRACT

There are proposed a method and system for information theory-based questioning for a goal-oriented dialog system. An information theory-based question provision system includes an approximate answer generation unit configured to generate an approximate answer by approximating the generation of an answer to a question by an answer module constituting a part of the goal-oriented dialog system; an intention inference unit configured to infer an intention value, which is the degree of proximity of the question to a goal, based on the answer of the answer module, and a question provision unit configured to provide a question to the answer module based on the intention value.

11 Claims, 2 Drawing Sheets

(56) References Cited

FOREIGN PATENT DOCUMENTS

| KR | 10-2014-0131307 A | 11/2014 |
| KR | 10-2017-0101052 A | 9/2017 |
| KR | 10-1775559 B1 | 9/2017 |
| KR | 10-2018-0058877 A | 6/2018 |
| KR | 20190133931 A * | 10/2019 ............. G10L 16/22 |

OTHER PUBLICATIONS

Ye, Borui, et al. "Learning question similarity with recurrent neural networks." 2017 IEEE international conference on big knowledge (icbk). IEEE, 2017. (Year: 2017).*

Rus, Vasile, Nobal Niraula, and Rajendra Banjade. "Similarity measures based on latent dirichlet allocation." Computational Linguistics and Intelligent Text Processing: 14th International Conference, CICLing 2013, Samos, Greece, Mar. 24-30, 2013, Proceedings, Part I 14. Springer Berlin Heidelberg (Year: 2013).*

Young, Steve, et al. "Pomdp-based statistical spoken dialog systems: A review." Proceedings of the IEEE 101.5 (2013): 1160-1179. (Year: 2013).*

Soo-Young Kim, et al., "Development of a Conversational Help Agent Using Approximate Pattern Matching", Korean Journal of Cognitive Science, Dec. 2002, pp. 1-8.

International Search Report for PCT/KR2018/014008 dated Aug. 13, 2019 (PCT/ISA/210).

* cited by examiner

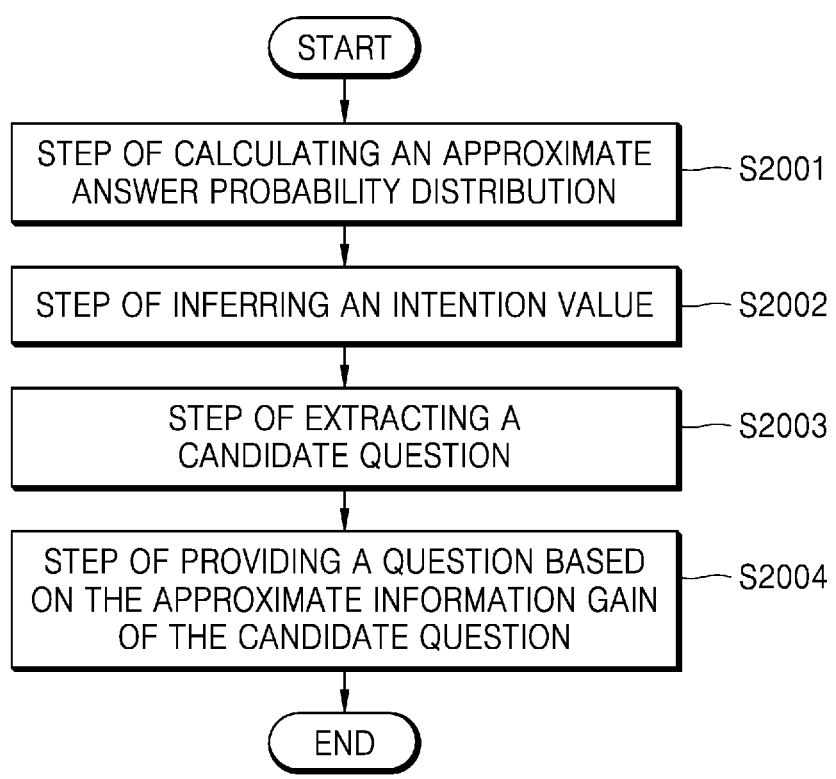

METHOD AND SYSTEM FOR INFORMATION THEORY-BASED QUESTIONING FOR GOAL-ORIENTED DIALOG SYSTEM

CROSS REFERENCE TO RELATED APPLICATIONS

This application is a National Stage of International Application No. PCT/KR2018/014008 filed Nov. 15, 2018, claiming priority based on Korean Patent Application No. 10-2018-0131716 filed Oct. 31, 2018.

TECHNICAL FIELD

The embodiments disclosed herein relates to a method and system for information theory-based questioning for a goal-oriented dialog system, and more particularly to a method and apparatus for information theory-based questioning that calculate the suitability of questions based on an information theory and then select a question for the purpose of performing a goal-oriented dialog, which is an application challenge of artificial intelligence.
Year 2018 Project Numbers and Acknowledgements
  1-1. Project Serial No.: 1711065242
  1-2. Korean acknowledgement: 본 연구는 과학기술정보통신부 및 정보통신기술진흥센터의 SW 컴퓨팅산업원천기술개발사업 (SW 스타랩) 의 연구결과로 수행되었음" (IITP-2018-1711065242)
  1-3. English acknowledgement: This research was supported by the MSIT (Ministry of Science and ICT), Korea, under the SW Starlab support program (IITP-2018-1711065242) supervised by the IITP Institute for Information & communications Technology Promotion
  1-4. Contribution Ratio: 4/10
  2-1. Project Serial No.: 1415155958
  2-2. Korean acknowledgement: 본 연구는 2018 년도 산업통상자원부 및 산업기술평가관리원 (KEIT) 연구비 지원에 의한 연구임 ('1415155958")
  2-3. English acknowledgement: This work was supported by the Technology Innovation Program (or Industrial Strategic Technology Development Program) (1415155958, A robot intelligence software framework as an open and self-growing integration foundation of intelligence and knowledge for personal service robots) funded By the Ministry of Trade & Energy (MOTIE, Korea)
  2-4. Contribution Ratio: 3/10
  3-1. Project Serial No.: 1711073695
  3-2. Korean acknowledgement: 본 연구는 2018 년도 정부(과학기술정보통신부)의 재원으로 정보통신기술진흥센터의 지원을 받아 수행된 연구임 (No. 2017-0-01772, 비디오 튜링 테스트를 통과할 수준의 비디오 스토리 이해 기반의 질의응답 기술 개발)
  3-3. English acknowledgement: This work was supported by Institute for Information & communications Technology Promotion (IITP) grant funded by the Korea government (MSIT) (No. 2017-0-01772, Development of QA systems for Video Story Understanding to pass the Video Turing Test)
  3-4. Contribution Ratio: 3/10

BACKGROUND ART

Recently, artificial intelligence via deep learning has developed dramatically. As artificial intelligence has developed, it is being applied in various fields.

In particular, artificial intelligence is being applied to dialog-related tasks such as digital assistants, telephone orders, and online questions and answers among the fields to which artificial intelligence is to be applied.

Artificial intelligence applied to such a dialog task performs a dialog by generating a question and providing it to an answerer, who is a counterpart.

To this end, artificial intelligence utilizing a large amount of data and a deep learning technique was applied to a dialog task. Desirable results were exhibited in a dialog in which the process of generating a question and answering the generated question was performed once.

However, when a dialog continues, a problem arises in that artificial intelligence cannot ask appropriate questions. In particular, there arises the problem of repeatedly generating the same question while acting as a questioner.

In connection with this, Korean Patent Application Publication No. 10-2016-0141804, which is a prior art document, discloses a dialog apparatus and method using artificial intelligence. According to the disclosed content, a voice of a user is signaled and converted into a voice signal to determine the information of the user, a previously stored script signal corresponding to the voice signal is extracted, and the script signal is extracted and converted into a voice. However, this technology cannot overcome the problem of being unable to generate an appropriate question based on the content of a dialog.

Therefore, there is a need for a technology capable of overcoming the above-described problems.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

An object of the embodiments disclosed herein is to propose a method and system for information theory-based questioning that calculate the suitability of questions and select a question suitable for an answer of a counterpart.

An object of the embodiments disclosed herein is to propose a method and system for information theory-based questioning that infer the intention of a counterpart who answers.

An object of the embodiments disclosed herein is to propose a method and system for information theory-based questioning that select an appropriate question through learning based on training data.

An object of the embodiments disclosed herein is to propose a method and system for information theory-based questioning that perform learning based on a self-dialog method.

An object of the embodiments disclosed herein is to propose a method and system for information theory-based questioning that provide a question candidate based training data An object of the embodiments disclosed herein is to propose a method and system for information theory-based questioning that provide a question candidate based on deep learning.

Technical Solution

As a technical solution for accomplishing the above objects, according to an embodiment, there is provided an information theory-based question provision system for a goal-oriented dialog system, the question provision system including: an approximate answer generation unit configured to generate an approximate answer by approximating the generation of an answer to a question by an answer module constituting a part of the goal-oriented dialog system; an intention inference unit configured to infer an intention value, which is the degree of proximity of the question to a goal, based on the answer of the answer module; and a question provision unit configured to provide a question to the answer module based on the intention value.

According to another embodiment, there is provided an information theory-based question provision method for a goal-oriented dialog system performed by a question provision system, the question provision method including: generating an approximate answer by approximating the generation of an answer to a question by an answer module constituting a part of the goal-oriented dialog system; inferring an intention value, which is the degree of proximity of the question to a goal, based on the answer of the answer module; and providing a question to the answer module based on the intention value.

According to still another embodiment, there is provided a computer-readable storage medium having stored thereon a program that performs a question provision method, wherein the question provision method includes: generating an approximate answer by approximating the generation of an answer to a question by an answer module constituting a part of the goal-oriented dialog system; inferring an intention value, which is the degree of proximity of the question to a goal, based on the answer of the answer module; and providing a question to the answer module based on the intention value.

According to another embodiment, there is provided a computer program executed by a question provision system and stored in a storage medium to perform a question provision method, wherein the question provision method includes: generating an approximate answer by approximating the generation of an answer to a question by an answer module constituting a part of the goal-oriented dialog system; inferring an intention value, which is the degree of proximity of the question to a goal, based on the answer of the answer module; and providing a question to the answer module based on the intention value.

Advantageous Effects

According to any one of the above-described technical solutions, there may be proposed the method and system for information theory-based questioning that calculate the suitability of questions and select a question suitable for an answer of a counterpart.

According to any one of the above-described technical solutions, there may be proposed the method and system for information theory-based questioning that infer the intention of a counterpart who answers.

According to any one of the above-described technical solutions, there may be proposed the method and system for information theory-based questioning that select an appropriate question through learning based on training data.

According to any one of the above-described technical solutions, there may be proposed the method and system for information theory-based questioning that perform learning based on a self-dialog method.

According to any one of the above-described technical solutions, there may be proposed the method and system for information theory-based questioning that provide a question candidate based on training data According to any one of the above-described technical solutions, there may be proposed the method and system for information theory-based questioning that provide a question candidate based on deep learning.

The effects that can be obtained by the embodiments disclosed herein are not limited to the above-described effects, and other effects that have not been described above will be clearly understood by those having ordinary skill in the art, to which the present invention pertains, from the following description.

DESCRIPTION OF DRAWINGS

FIG. 2 is a flowchart illustrating an information theory-based question provision method according to an embodiment.

MODE FOR INVENTION

Figure 1:
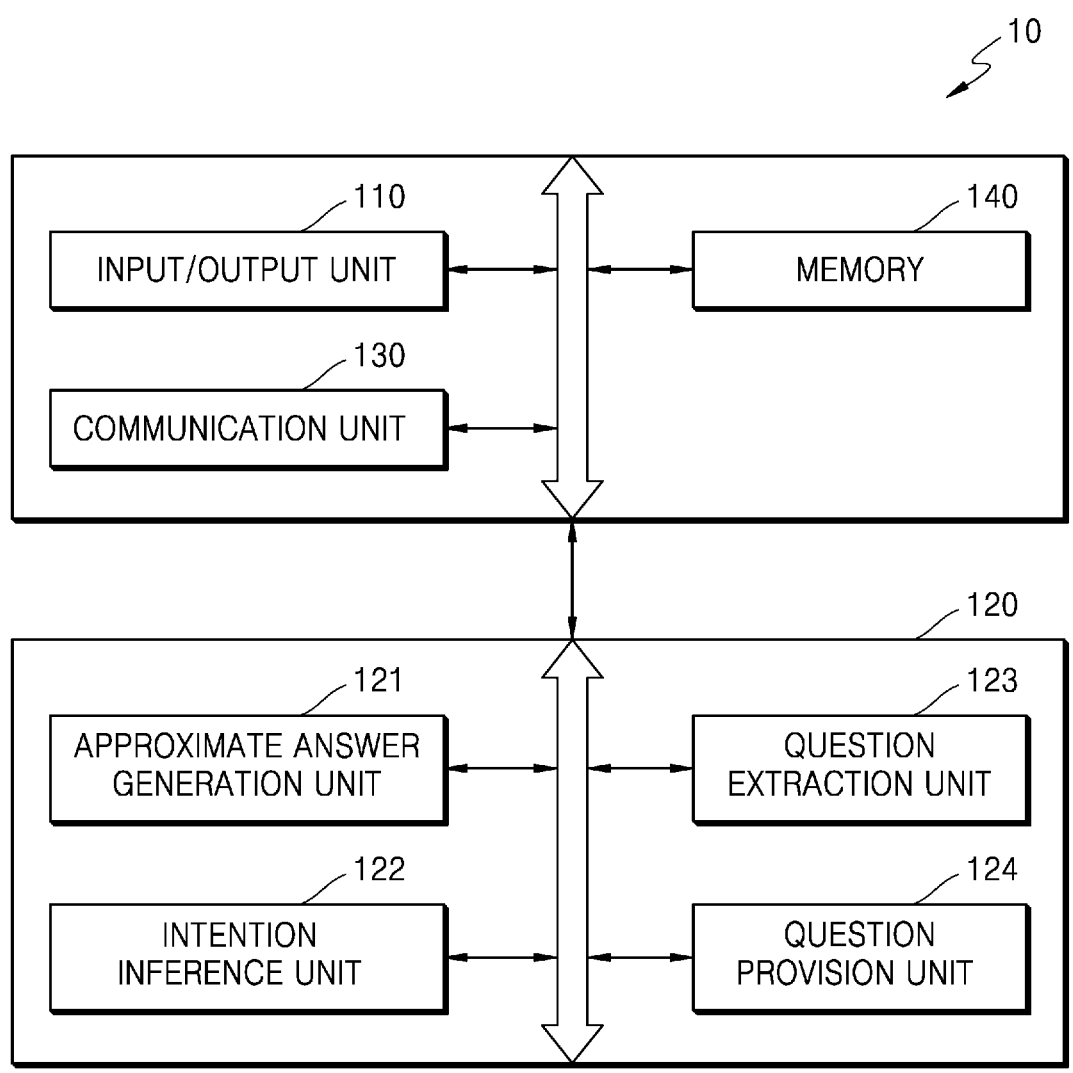
FIG. 1 is a block diagram showing an information theory-based question provision system according to an embodiment.

Various embodiments will be described in detail below with reference to the accompanying drawings. The following embodiments may be modified to various different forms and then practiced. In order to more clearly illustrate features of the embodiments, detailed descriptions of items which are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is 'directly connected' to the other component but also a case where the one component is 'connected to the other component with a third component disposed therebetween.' Furthermore, when one portion is described as "including" one component, this does not mean that the portion does not exclude another component but means that the portion may further include another component, unless explicitly described to the contrary.

The embodiments will be described in detail below with reference to the accompanying drawings.

Prior to the following description, the meanings of the terms used below will be defined first.

The 'information gain' is a decrease in the uncertainty of a correct answer obtained by comparing the presence and absence of a hint for the correct answer, and refers to the amount of mutual information in the present specification. The uncertainty of a correct answer is measured as the entropy of the correct answer.

The 'goal-oriented dialog system' is a system that generates a question targeted by a machine questioner by using artificial intelligence. Such a goal-oriented dialog system may include a question module configured to generate and provide a question and an answer module configured to provide an answer to a question.

Terms requiring descriptions other than the terms defined above will be separately described below.

FIG. 1 is a block diagram illustrating a question provision system 10 according to an embodiment.

The question provision system 10 may be implemented as a computer, a mobile terminal, a television, a wearable device, or the like which can access a remote server or can be connected to another terminal and a server over a network N. In this case, the computer includes, e.g., a notebook, a desktop, a laptop, and the like each equipped with a web browser. The portable terminal is, e.g., a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, and the like. Furthermore, the television may include an Internet Protocol Television (IPTV), an Internet Television (Internet TV), a terrestrial TV, a cable TV, and the like. Moreover, the wearable device is an information processing device of a type which can be directly worn on a human body, such as a watch, glasses, an accessory, clothing, shoes, or the like, and can access a remote server or be connected to another terminal directly or via another information processing device over a network.

The question provision system 10 may be implemented in the question module of a goal-oriented dialog system. The goal-oriented dialog system may be divided into an answer module configured to answer a question and a question module configured to guess the intention of an answerer through a question.

Referring to FIG. 1, the question provision system 10 according to an embodiment may include an input/output unit 110, a control unit 120, a communication unit 130, and memory 140.

The input/output unit 110 may include an input unit configured to receive input from a user and an output unit configured to display information such as the result of the performance of a tack or the status of the question provision system 10. For example, the input/output unit 110 may include an operation panel configured to receive a user input and a display panel configured to display a screen.

More specifically, the input unit may include devices capable of receiving various types of user input, such as a keyboard, a physical button, a touch screen, a camera, or a microphone. Furthermore, the output unit may include a display panel or a speaker. However, the input/output unit 110 is not limited thereto, but may include components capable of supporting various types of input/output.

The control unit 120 controls the overall operation of the question provision system 10, and may include a processor such as a central processing unit (CPU). The controller 120 may control other components included in the question provision system 10 to perform an operation corresponding to a user input received through the input/output unit 110.

For example, the control unit 120 may execute a program stored in the memory 140, read a file stored in the memory 140, or store a new file in the memory 140.

The control unit 120 may include an approximate answer generation unit 121, an intention inference unit 122, a question extraction unit 123, and a question provision unit 124.

First, the approximate answer generation unit 121 may generate an approximate answer by approximating the generation of an answer to a question by the answer module constituting a part of the goal-oriented dialog system.

In other words, the approximate answer generation unit 121 is an approximation of the answer module of the goal-oriented dialog system, is different from the actual answer module, and cannot directly calculate the answer probability distribution p of the answer module.

Accordingly, an approximate answer probability distribution $\tilde{p}$ approximating the answer probability distribution p of the answer module as follows may be generated.

Such $\tilde{p}$ may be acquired through the training on training data, as in the case where the answer module is trained to minimize the cross-entropy of the overall answer probability distribution P, or may be extracted from the answer module.

Furthermore, the intention inference unit 122 may infer an intention value c, which is the degree of proximity of the question to a goal, based on the answer of the answer module.

In other word, the intention value c of the answer may be calculated through Equation 1 below.

$$p(c|a_{1:t}, q_{1:t}) \propto p(c) \Pi_j^t p(a_j|c, q_j, a_{1:j-1}, q_{1:j-1}) \quad (1)$$

p: the answer probability distribution of the answer module

However, as described above, the answer probability distribution of the answer module cannot be calculated, and thus the approximate answer probability distribution $\tilde{p}$ calculated by the approximate answer generator 121 is used. Furthermore, the intention inference unit 122 may infer the intention value c by using Equation 2 below.

$$\hat{p}(c|a_{1:t}, q_{1:t}) \propto \hat{p}'(c) \Pi_j^t \tilde{p}(a_j|c, q_j, a_{1:j-1}, q_{1:j-1}) \quad (2)$$

$\hat{p}'(c)$: the prior probability distribution of the intention value c $\hat{p}(c|a_{1:t}, q_{1:t})$ (simply $\hat{p}$): the posterior probability distribution of the intention value c When the answer probability distribution $p(a_t|c, q_t, a_{1:t-1}, q_{1:t-1})$ of the answerer is fixed and the likelihood $\hat{p}$ is the same as the answer probability distribution $p(a_t|c, q_t, a_{1:t-1}, q_{1:t-1})$ the function of the question provision system 10 is optimized.

Furthermore, the question extraction unit 123 may extract a candidate question for the question to be provided to the answer module constituting the part of the goal-oriented dialog system.

According to one embodiment, the question extraction unit 123 may extract a candidate question through pre-stored training data.

In other words, the question extraction unit 123 may extract the candidate question by using training data previously acquired by a person through actual goal-oriented dialogs.

For example, the question extraction unit 123 may randomly extract a question from among the questions of the training data.

Alternatively, for example, the question extraction unit 123 may extract a set of candidate questions, expected to be independent because an answer probability distribution is equal to or larger than a preset value, from the training data. In other words, the question extraction unit 123 may extract a candidate question to satisfy Equation 3 below.

$$\Sigma_a \tilde{p}^\dagger(a_i=a|q_i, a_j=a, q_j) < 0.95 \quad (3)$$

In other words, the candidate question may be selected such that the probability that answers to any two questions possessed by the question extraction unit 123 are the same is less than 95%.

According to another embodiment, the question extraction unit 123 may generate a plurality of questions from recurrent neural networks (RNNs) and extract candidate questions in probability order.

For example, the question extraction unit 123 may generate a plurality of questions and use them as candidate questions without learning existing dialogs.

Alternatively, for example, the question extraction unit 123 may extract the candidate question from among questions, generated through machine learning on the training data, based on a probability. In other words, the question extraction unit 123 may generate a question by performing machine learning using an existing dialog as training data whenever acquiring a question and an answer to the question, and may use the generated question as a candidate question.

Furthermore, the question provision unit 124 may provide a question to the answer module based on the intention value c.

To this end, the question provision unit 124 may calculate the information gain I for each candidate question extracted by the question extraction unit 123.

In other words, the objective functions of the intention extraction unit 122 and the question provision unit 124 maximize $p(a_t|c, q_t, a_{1:t-1}, q_{1:t-1})$ and $p(c|a_{1:t}, q_{1:t})$, respectively.

In this case, the objective function of the question provision unit 124 maximizes the information gain I of Equation 4 below.

$$I[C, A_t; q_t, a_{1:t-1}, q_{1:t-1}] = \tag{4}$$
$$H[C; a_{1:t-1}, q_{1:t-1}] - H[C|A_t; q_t, a_{1:t-1}, q_{1:t-1}] =$$
$$\sum_{a_t}\sum_c P(c|a_{1:t-1}, q_{1:t-1})p(a_t|c, q_t, a_{1:t-1}, q_{1:t-1})ln\frac{p(a_t|c, q_t, a_{1:t-1}, q_{1:t-1})}{p(a_t|q_t, a_{1:t-1}, q_{1:t-1})}$$

However, the above-described answer probability distribution p relates to the answerer, and cannot be directly calculated. Accordingly, the question provision unit 124 may use the approximate answer probability distribution $\tilde{p}$ calculated by the approximate answer generation unit 121, in which case the question provision unit 124 may calculate the approximate information gain I using the intention value c inferred by the intention extraction unit 122.

In this case, the question provision unit 124 may calculate an approximate information gain $\tilde{I}$ for the candidate question extracted by the question extraction unit 123 according to Equation 5.

$$q_t^* = \underset{q_t \in Q}{\mathrm{argmax}} \tilde{I}[C, A_t; q_t, a_{1:t-1}, q_{1:t-1}] = \underset{q_t \in Q}{\mathrm{argmax}} \tag{5}$$
$$\sum_{a_t}\sum_c \tilde{p}(c|a_{1:t-1}, q_{1:t-1})\tilde{p}(a_t|c|q_t, a_{1:t-1}, q_{1:t-1})ln\frac{\tilde{p}(a_t|c, q_t, a_{1:t-1}, q_{1:t-1})}{\tilde{p}'(a_t|q_t, a_{1:t-1}, q_{1:t-1})}$$

According to an embodiment, when the question extraction unit 123 generates a candidate question using an RNN, Equation 5 may be replaced with Equation 6.

$$I[C, A_t; q_t, a_{1:t-1}, q_{1:t-1}] + \lambda \cdot \tilde{p}^\dagger(q_t|a_{1:t}, q_{1:t}) \tag{6}$$

$\tilde{p}^\dagger(q_t|a_{1:t}, q_{1:t})$: the probability of $q_t$ denoted by the RNN of the question extraction unit 123

Furthermore, the question provision unit 124 may provide one of the candidate questions having a maximum approximate information gain value as a question for the answerer.

Meanwhile, the communication unit 130 may perform wired or wireless communication with another device or network. To this end, the communication unit 130 may include a communication module configured to support at least one of various wired and wireless communication methods. For example, the communication module may be implemented in the form of a chipset.

The wireless communication supported by the communication unit 130 may be, for example, Wireless Fidelity (Wi-Fi), Wi-Fi Direct, Bluetooth, Ultra Wide Band (UWB), or Near Field Communication (NFC). Furthermore, the wired communication supported by the communication unit 130 may be, for example, USB or High Definition Multimedia Interface (HDMI).

Various types of data, such as files, applications, and programs, may be installed and stored in the memory 140. The controller 120 may access and use data stored in the memory 140, or may store new data in the memory 140. Furthermore, the control unit 120 may execute a program installed in the memory 140. Referring to FIG. 1, an information theory-based question provision program for performing a goal-oriented dialog may be installed in the memory 140.

FIG. 2 is a flowchart illustrating a question provision method according to an embodiment.

The question provision method according to the embodiment shown in FIG. 2 includes steps that are performed in a time-series manner in the question provision system 10 shown in FIG. 1. Accordingly, the descriptions that are omitted below but are given above in conjunction with the question provision system 10 shown in FIG. 1 may be also applied to the question provision method according to the embodiment shown in FIG. 2.

First, the question provision system 10 may generate an approximate answer by approximating the generation of an answer to a question by the answer module constituting a part of the goal-oriented dialog system at step S2001.

For example, the question provision system 10 may approximate an approximate answer probability distribution $\tilde{p}(a|c, q)$ based on the content of an existing dialog $h_{t-1}=(a_{1:t-1}, q_{1:t-1})$.

Furthermore, the question provision system 10 may infer an intention value, which is the degree of proximity of the question to a goal, based on the answer of the answer module at step S2002.

For example, the question provision system 10 can calculate the intention value c, which is the degree of proximity of the question, based on the answer probability distribution p of the answer module. However, since the answer probability distribution p cannot be calculated directly, the question provision system 10 can calculate the intention value c using an approximate answer probability distribution $\tilde{p}$.

Thereafter, the question provision system may extract a candidate question of a question to be provided to the answer module constituting a part of the goal-oriented dialog system at step S2003.

For example, the question provision system 10 may extract a candidate question $\{\breve{q}^{(1)}, \ldots, \breve{q}^{(|Q|)}\}$ from a set of questions included in existing training data according to a preset method such as randomness or probability.

Alternatively, for example, the question provision system 10 may generate a question using an RNN, and may extract the generated question as a candidate question.

Furthermore, the question providing system 10 may provide a question to the answer module based on the intention value at step S2004.

To this end, the question providing system 10 may calculate the information gain for the candidate question extracted in step S2003.

For example, the question provision system 10 may calculate the information gain I for each candidate question $\{\tilde{q}^{(1)}, \ldots, \tilde{q}^{(|Q|)}\}$ extracted at step S2003 based on the approximate answer probability distribution $\tilde{p}$ approximated at step S2001 and the intention value c inferred at step S2002.

Furthermore, the question provision system 10 may provide a question $q_t$ having the highest information gain I to an answerer.

Thereafter, the question provision system 10 may provide an answer $a_t$ to the question, provided at step S2004, to the answerer based on the approximated approximate answer probability distribution.

Thereafter, the question provision system 10 may update the approximated approximate answer probability distribution the based on the answer $a_t$ to the question provided at step S2004.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in 'unit(s)' may be coupled to a smaller number of components and 'unit(s)' or divided into a larger number of components and 'unit(s).'

In addition, components and 'unit(s)' may be implemented to run one or more CPUs in a device or secure multimedia card.

The question provision method according to the embodiment described via FIG. 2 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the question provision method according to the embodiment described via FIG. 2 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the question provision method according to the embodiment described via FIG. 2 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection desired via the present specification should be defined by the attached claims, rather than the detailed description. All modifications and variations which can be derived from the meanings, scopes and equivalents of the claims should be construed as falling within the scope of the present invention.

INDUSTRIAL APPLICABILITY

The present invention has industrial applicability for a method and system for information theory-based questioning for a goal-oriented dialog system, particularly a method and apparatus for information theory-based questioning that calculate the suitability of questions based on an information theory and then select a question for the purpose of performing a goal-oriented dialog, which is an application challenge of artificial intelligence.

The invention claimed is:

1. An information theory-based question provision system for a goal-oriented dialog system, the question provision system comprising at least one processor,
wherein the at least one processor, by executing instructions, is configured to,
in a situation where a dialog of exchanging questions and answers continues with an answer program module that is executed by the at least one processor, generate an approximate answer based on a content of existing dialog data by approximating generation of an expected answer to a question to be provided to the answer program module communicating with the goal-oriented dialog system;
infer an intention value, which is a degree of proximity of the question to a goal, based on an approximate answer probability distribution, which is a probability distribution for the approximate answer;
extract candidate questions that satisfy a condition that a probability of answering any two questions with the same answer is less than a preset threshold based on the approximate answer probability distribution;
calculate an information gain for each of the candidate questions based on the approximate answer probability distribution and the intention value, select a question to be provided to the answer program module from the candidate questions based on the information gain, and provide the selected question to the answer program module; and
after providing the selected question, update the approximate answer probability distribution based on the answer of the answer program module for the selected question.

2. The question provision system of claim 1, wherein the at least one processor, by the executing instructions, configured to extract a candidate question for the question to be provided to the answer program module constituting the part of the goal-oriented dialog system.

3. The question provision system of claim 2, wherein the at least one processor, by the executing instructions, is configured to extract the candidate question from previously stored training data.

4. The question provision system of claim 2, wherein the at least one processor, by the executing instructions, is configured to extract the candidate question from among questions, generated through machine learning on previously stored training data, based on probability.

5. The question provision system of claim 2, wherein the at least one processor, by the executing instructions, is configured to calculate an approximate information gain for the candidate question, and selects the question to be provided to the answer program module.

6. An information theory-based question provision method for a goal-oriented dialog system performed by a question provision system, the question provision method comprising:
in a situation where a dialog of exchanging questions and answers continues with an answer program module that is executed by at least one processor, generating an approximate answer based on a content of an existing dialog data by approximating generation of an expected answer to a question to be provided to the answer program module communicating with the goal-oriented dialog system;
inferring an intention value, which is a degree of proximity of the question to a goal, based on an approximate answer probability distribution, which is a probability distribution for the approximate answer;
extracting candidate questions that satisfy a condition that a probability of answering any two questions with the same answer is less than a preset threshold based on the approximate answer probability distribution;
calculating an information gain for each of the candidate questions based on the approximate answer probability distribution and the intention value, selecting a question to be provided to the answer program module from the candidate questions based on the information gain, and providing the selected question to the answer program module; and
after providing the selected question, updating the approximate answer probability distribution based on the answer of the answer program module for the selected question.

7. The question provision method of claim 6, further comprising extracting a candidate question for the question to be provided to the answer program module constituting the part of the goal-oriented dialog system.

8. The question provision method of claim 7, wherein extracting the candidate question comprises extracting the candidate question from previously stored training data.

9. The question provision method of claim 7, wherein extracting the candidate question comprises extracting the candidate question from among questions, generated through machine learning on previously stored training data, based on probability.

10. The question provision method of claim 7, wherein providing the question to the answer program module comprises:
calculating an approximate information gain for the candidate question; and
selecting the question to be provided to the answer program module.

11. A non-transitory computer-readable storage medium having stored thereon a program that when executed by at least one processor, performs the method set forth in claim 6.

* * * * *